United States Patent [19]
Mills

[11] Patent Number: 6,021,984
[45] Date of Patent: Feb. 8, 2000

[54] BRACKET FOR ATTACHMENT OF OPTICAL DEVICES AND OTHER SUPPORT APPARATUSES TO SUPPORT OBJECTS

[76] Inventor: James Everett Mills, 12805 Shady Shores Dr., Tampa, Fla. 33613-4141

[21] Appl. No.: 09/090,126

[22] Filed: Jun. 3, 1998

Related U.S. Application Data

[60] Provisional application No. 60/048,236, Jun. 2, 1997.

[51] Int. Cl.[7] ..................................................... B32B 7/02
[52] U.S. Cl. ..................................... 248/219.4; 248/230.8
[58] Field of Search ............................ 248/219.4, 218.4, 248/219.1, 230.8; 396/428, 419

[56] References Cited

U.S. PATENT DOCUMENTS

| | | | |
|---|---|---|---|
| D. 363,945 | 11/1995 | Labree | D16/242 |
| 4,150,733 | 4/1979 | Plummer | 182/187 |
| 4,325,529 | 4/1982 | Seebinger | 248/298 |
| 4,439,032 | 3/1984 | Congdon | 354/293 |
| 5,131,496 | 7/1992 | White | 182/187 |
| 5,263,675 | 11/1993 | Roberts et al. | 248/219.4 |
| 5,351,923 | 10/1994 | Booth | 248/217.1 |
| 5,497,214 | 3/1996 | Labree | 396/428 |
| 5,622,342 | 4/1997 | Mills | 248/126 |
| 5,649,257 | 7/1997 | Kempka | 396/248 |
| 5,685,103 | 11/1997 | Wiggins | 42/94 |

OTHER PUBLICATIONS

National Products Inc.; RAm Catalog; ; May 1, 1998; 10pgs.

*Primary Examiner*—Ramon O. Ramirez

[57] ABSTRACT

An improved device for attachment of support apparatuses such as a tripod, support accessory, adjustable ball and socket support arms, and the like, to supplemental support objects such as a tree or limb, post or rail or other environmental objects, is herein provided. Convenient portable support of cameras, spotting scopes, optical devices and other devices is enhanced by enabling placement at usable heights, locations, and positions beyond the capabilities of the support apparatus alone. Shown as generally rectangular in shape, the support attachment device has a support apparatus side and supplemental support side, and an upper and lower end. FIG. 1 shows the support apparatus side 10 of the support attachment device. A support receiving groove 12 begins at the upper end 14 and ends at the lower end 16. Support receiving groove 12 divides a first support apparatus face 18 and second support apparatus face 20. A first rope clenching cleat 22 is contained upon first support apparatus face 18 and a second rope clenching cleat 24 is contained upon second support apparatus face 20. First rope clenching cleat 22 and second rope clenching cleat 24 are passive means for tightly clenching a flexible binding means such as common rope or the like. A rope placed within a rope clenching cleat is tightly bound without the need for a buckle requiring manual manipulation. No additional manually operated clamp or buckle is needed. By using common rope as a flexible means or secure attachment, the user is not limited by finite lengths of normal straps or finite sizes of normal clamps, but instead enabled to easily add to length as needed.

6 Claims, 6 Drawing Sheets

BRACKET FOR ATTACHMENT OF OPTICAL DEVICES AND OTHER SUPPORT APPARATUSES TO SUPPORT OBJECTS

CROSS REFERENCES TO RELATED APPLICATIONS

This applications references Provisional Patent Application, Application No. 60/048,236, Filed On Jun. 2, 1997.

BACKGROUND

1. Field of Invention

The present invention relates to support brackets for attachment to supplemental support objects, and more particularly to such brackets having means for support of optical devices and the like.

2. Description of Prior Art

Brackets intended to act as a connector between a variety of support apparatuses and support objects are well known. Typically such brackets will either attach to such support objects by traditional means such as clamps, screws, bolts or like fasteners, magnets, adhesive, or the like, as well as flexible binding means.

Known brackets that utilize flexible binding means will typically utilize a variety of strapping materials. Such strapping materials will typically be secured by traditional clamping or clenching means such as buckles, slides, turnbuckles, or the like. Occasionally means such as chains and beaded or knotted material combined with catches such as hooks or chain notches will be employed as a clenching means. Such means have served most applications well. However, the aforementioned means fall short of meeting the needs of the outdoor user of certain optical devices such as cameras, spotting scopes and the like.

Whereas it is desirable to enable a user of such optical devices to attach such to environmental objects such as trees, posts, and the like, known binding and clenching means suffer from one or more of the following limitations.

Clamps, screws, bolts and like fasteners are associated with permanent to semi-permanent attachment and suffer from severe restrictions as to the range of size and shape of the support object.

Strapping materials suffer from finite length restrictions. Additionally, use of typical buckles, slides clasps and the like require significant manipulation. Such manipulation requires substantial manual dexterity to simultaneously attach and hold support objects and subsequently position and tighten such binding means. Even strapping materials utilizing hook and loop securing means suffers from finite length limitations as well as a tendency to accidentally engage extraneous environmental surfaces which is a bothersome restriction.

Instead, the present invention provides for the use of common rope, cord or the like, as well as such cord or rope in addition to conventional strapping means and the like, as a preferred flexible binding means.

A limitation of using rope as a binding means is seen when the user attempts to encompass a supported device and a supplemental support object and then secure such rope in a tight and unyielding manner. Tying complex knots that provide instant security takes time and manual dexterity. Additionally, removal of supported devices from collateral support objects then requires untying such knots, an additional need for manual dexterity.

The marine industry has long known the attributes of rope in it's various manifestations. Nowhere is rope more frequently used as a binding and holding means than in sailing. The need for instant clenching of rope type binding means is well known. A variety of mechanical and passive rope clenching means have been presented.

Clenching means such as conventional cleats, cleats that utilize movable cams, and the like are frequently used. In my U.S. Pat. No. 5,622,342 I have provided for the use of passive rope clenching means as described in the patent. The present invention utilizes similar passive rope clenching means to enable instant, tight, and unyielding clenching of rope or the like used as a binding means.

Other patents and available products have attempted to provide attachment means as described below. None have been shown that utilize the novel combination of a support structure combined with such passive clenching means. Such a combination yields significant, and heretofore unknown new benefits as will become apparent from the following disclosure.

In U.S. Pat. No. 5,649,257 to Scott A. Kempka (Oct. 10, 1900) Kempka describes a tree mounted camera support requiring the use of two or more support straps having conventional buckle binding means in combination with a non-adjustable support arm rigidly fixed to a planar tree support portion. The planar support portion includes no integral clenching means for the binding means (straps).

U.S. Pat. No. 5,622,342 to James E. Mills (Apr. 22, 1997). In my U.S. Pat. No. 5,622,342, an apparatus with the capability of both attachment to collateral support and disposal in a free standing mode is disclosed. While possessing many attributes of said patent, the present device lacks free standing capability, but benefits by potentially being more compact and lighter in weight.

U.S. Pat. No. 4,439,032 to Jon M Congdon (Mar. 27, 1984). Congdon provides a portable camera support including means for disposal in a free standing mode. Additionally, no integral means for clenching of binding means is provided.

U.S. Pat. No. D363,945 to Michael A. Labree (Nov. 7, 1995). LaBree describes a camera support design utilizing conventional strap and buckle binding means, and does not include integral clenching means.

U.S. Pat. No. 5,351,923 to Thorad L. Booth (Oct. 4, 1994). Booth shows a portable camera support utilizing a screw type attachment means supplemented by an angled support piece and does not include integral clenching means.

U.S. Pat. No. 4,325,529 to Frederick L. Seebinger (Apr. 20, 1982). Seebinger utilizes conventional strap and buckle means for attachment of his bracket to support objects and includes no integral clenching means.

U.S. Pat. No. 4,150,733 to Mace E. Plummer (Apr. 24, 1979). Plummer provides a tree mounted seat that utilizes a clamp of generally planar shape attached to a tree on it's edge by means of a fixed length chain. When attached, Plummers seat requires supplemental support afforded by a supplemental leg and hook arrangement disposed angularly from the bottom of the seat to the tree trunk.

U.S. Pat. No. 5,131,496 to George M. White (Jul. 21, 1992). White provides a hunter's tree seat utilizing at least two separate conventional attachment straps and includes no integral clenching means.

U.S. Pat. No. 5,685,103 to Erick D. Wiggins (Jan. 1, 1901). Wiggins shows a gun support attached to a tree by means of a flat (planar) plate and a conventional strap and buckle arrangement. Further, Wiggins provides a screw or the like as a rotational limiter on the lower end of the plate and includes no integral clenching means.

National Products Inc. of Seattle Washington in RAM Catalog (May 1, 1998) presents a variety of support attachment brackets. Such brackets are provided with conventional attachment means such as strap clamps, screws, bolts, C type clamps, suction cups, and saddle clamps. All means for attachment presented by National products suffer from the limitations aforementioned.

OBJECTS AND ADVANTAGES

Accordingly, it is an object of this invention to provide a supplemental support attachment device to be interposed between a support apparatus and a supplemental support object such as trees, limbs, posts, furniture, automobiles, fences, boats and other structures.

A further objective is for such support attachment to have integral means for clenching a flexible binding material.

It is an additional objective to provide such clenching means as will tightly clench such binding material.

Yet another object is to provide such support attachment that may simultaneously receive a support apparatus and a supplemental support object.

It is yet another object of this invention to provide such support apparatus that can be attached easily, securely, quietly, and without damage to a supplemental support object, utilizing readily available securing means such as common rope or cord, and/or conventional straps and buckles or clamps and the like.

It is another object of this invention to provide such support attachment that is attachable to a tripod or the like.

It is additionally an object of this invention to provide versatility by including additional adapters to improve the scope of use of the invention.

It is another object of this invention to provide a support attachment device with means to receive adjustable support means such as photographic ball heads, ball and socket joints and the like.

Still further objects and advantages will become apparent from a consideration of the ensuing description and accompanying drawings.

REFERENCE NUMERALS 10 support apparatus side
12 support receiving groove
14 upper end
16 lower end
18 first support apparatus face
20 second support apparatus face
22 first rope clenching cleat
24 second rope clenching cleat
26 supplemental support side
28 central concave surface
30 first support gripping wing
32 second support gripping wing
34 first support gripping edge
36 conventional tripod
38 attachment leg
40 supplemental support
42 attaching rope
44 rope receiving channel
46 rope gripping ridges
48 single unit rope clenching cleat
50 arcuate bolt type tripod
52 camera monorail
54 internal integral window receiving slot
56 central rotational point
58 camera mount receiving screw
60 tripod leg
62 support apparatus mounting bracket
64 lower portion
66 support apparatus mounting slotted bracket
68 second support gripping edge
70 gripping ridges
72 threaded stud
74 ball head
76 socket receiving ball
80 attachment strap
82 strap slot

SUMMARY

As can be seen by anyone familiar in the art, I have provided a novel approach for the attachment of a support apparatus to a supplemental support object. The combination of means for support apparatus attachment and supplemental support attachment by versatile means including common rope, secured by passive clenching means presents a heretofore unavailable utility to a user.

PREFERRED EMBODIMENT

Description

An improved device for attachment of support apparatuses to supplemental support objects is herein provided. Shown as generally rectangular in shape, the support attachment device has a first and second side and a first and second end.

Figures 1, 2A:
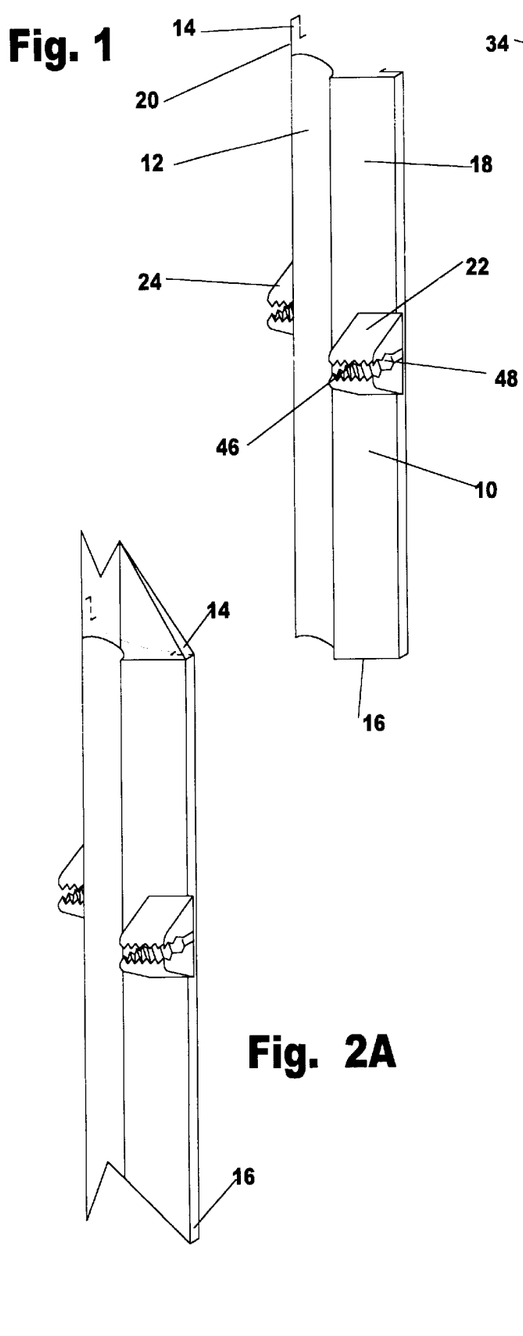
FIG. 1 is a view of the support apparatus side of the support attachment device.
FIG. 2A shows a support attachment device with V shaped ends.

FIG. 1 shows the support apparatus side 10 of the support attachment device. Support receiving groove 12 begins at the upper end 14 and ends at the lower end 16. Support receiving groove 12 divides a first support apparatus face 18 and second support apparatus face 20. A first rope clenching cleat 22 is contained upon first support apparatus face 18 and a second rope clenching cleat 24 is contained upon second support apparatus face 20. First rope clenching cleat 22 and second rope clenching cleat 24 contain rope receiving channel 44. Rope receiving channel 44 has sharply corrugated walls which form rope gripping ridges 46. The angle of declination of rope gripping ridges 46 is compound, running from the top of rope receiving channel 44 to the bottom of rope receiving channel 44 converging inwardly at the bottom of rope gripping ridges 46. A rope placed within rope receiving channel 44 is clenched by rope gripping ridges 46 as pulling force is applied.

Figure 9:
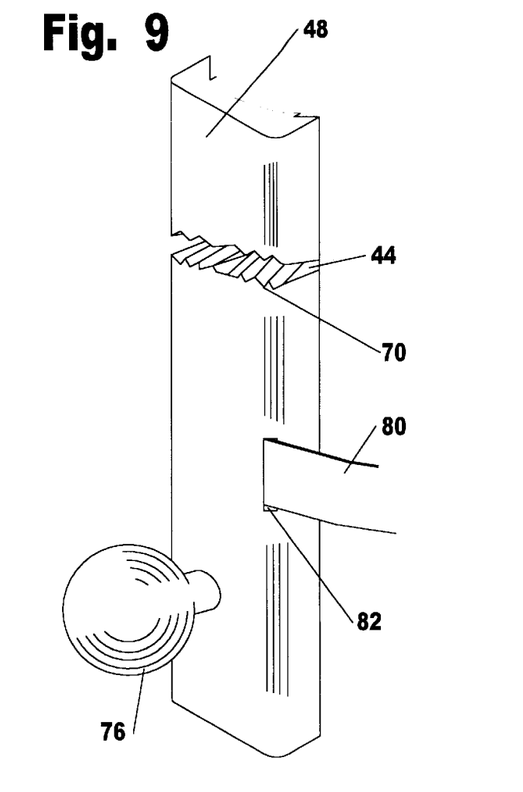
FIG. 9 is a support attachment device with a two way rope clenching cleat.

First rope clenching cleat 22 and second rope clenching cleat 24 are arranged so to prevent movement of attaching rope 42 (FIG. 4) in opposing directions. Alternatively, a single unit rope clenching cleat 48 as seen in FIG. 9 may be utilized. Single unit rope clenching cleat 48 has rope gripping ridges 70 as seen in first rope clenching cleat 22 and second rope clenching cleat 24. Such gripping ridges 70 converge in opposing angularity at the center of single unit rope clenching cleat 48. Such opposing angularity enables clenching of rope placed within single unit rope clenching cleat 48 in opposing directions.

Figure 2:
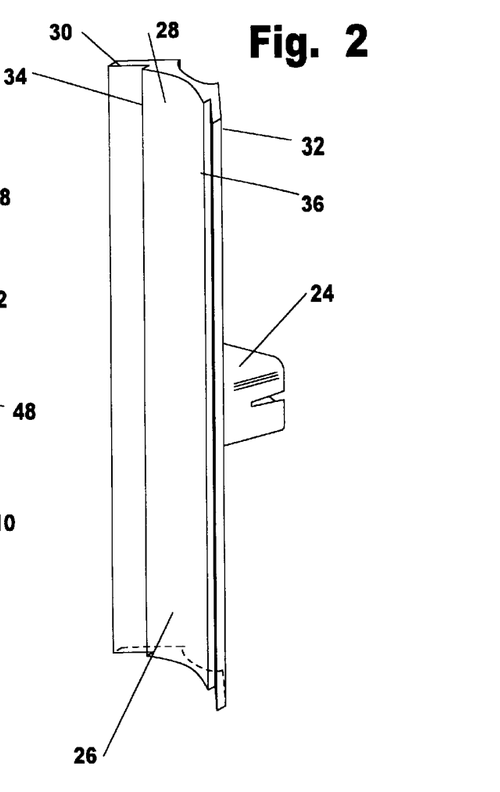
FIG. 2 is a view of the supplemental support side of the support attachment device.

FIG. 2 shows the supplemental support side 26 of the support attachment device. Supplemental support side 26 is formed by a central convex surface 28 which begins at upper end 14 and ends at lower end 16. Central concave surface 28 divides a first support gripping wing 30 and a second support gripping wing 32. A first support gripping edge 34 is formed where central concave surface 28 meets first support gripping wing 30 and a second support gripping edge 35 is formed where second support gripping wing 32 meets central concave surface 28. FIG. 2A shows the support attachment device of FIG. 1 wherein upper end 14 and lower end 16 terminate in a V shape.

Figure 3:
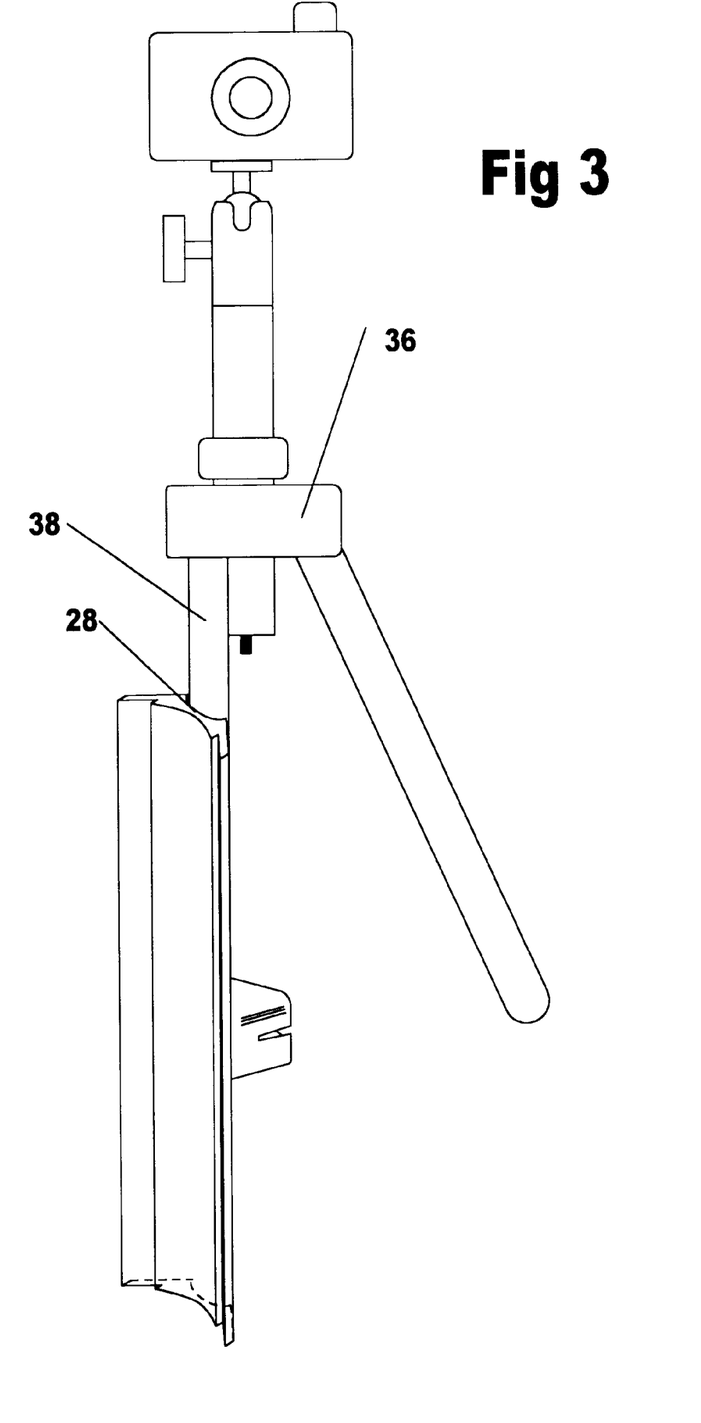
FIG. 3 shows a version of the support attachment device fitted to one leg of a tripod.

FIG. 3 shows a conventional tripod 36 configured with one attachment leg 38 that receives central concave surface 28 when the support attachment device is mounted upon attachment leg 38. Attachment leg 38 may be fixedly or removably attached to the support attachment device by means of conventional methods such as screws, clamps, bolts, snaps or the like or may be encompassed by attaching rope 42 as seen in FIG. 4.

Figure 4:
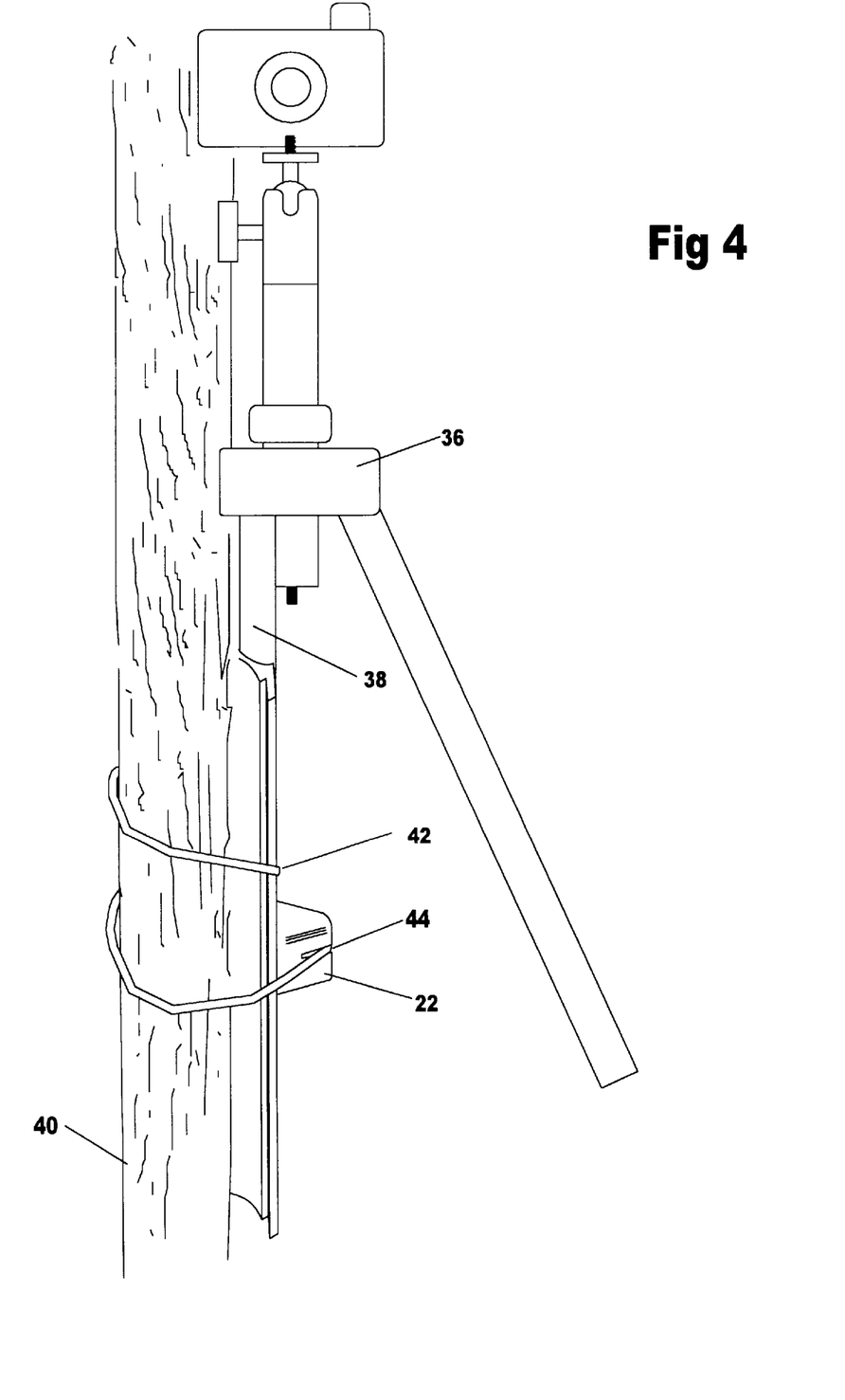
FIG. 4 shows a tripod with the support attachment device mounted on a tree.

FIG. 4 shows the assemblage of FIG. 3 attached to a supplemental support 40 (tree) by means of an attaching rope 42. Attaching rope 42 encircles attachment leg 38 and the support attachment device and supplemental support 40, beginning at second rope clenching cleat 24 and ending at first rope clenching cleat 22 (not shown).

Figure 5:
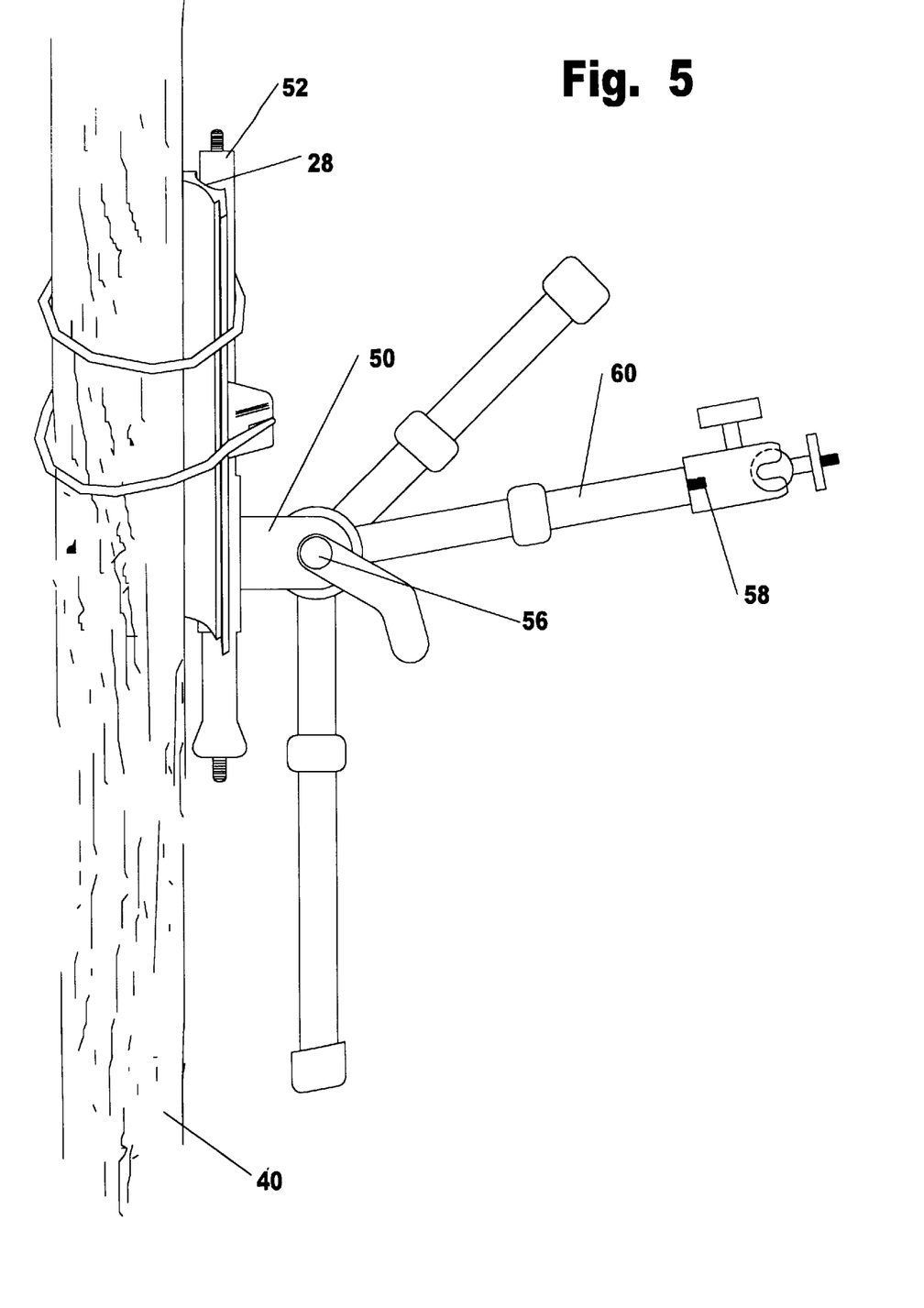
FIG. 5 shows a tripod of the arcuate bolt type mounted on a tree by means of the support attachment device.

FIG. 5 shows an arcuate bolt type tripod 50. Camera monorail 52 is received in central concave surface 28 and secured to supplemental support 40 in the same manner as seen in FIG. 4. Optical device attachment means or the like is connected to the distal end of tripod leg 60. Such a tripod may be especially suitable for use of the support attachment device. By utilizing a central rotational point 56 about which the three tripod legs as well as camera monorail 52 rotate, excellent utility is achieved. Addition of a camera mount receiving screw 58 on one or more of the three tripod legs enables the arcuate bolt type tripod 50 to be configured to adjustably support a variety of optical devices and the like.

Operation

The present invention is intended to be used in conjunction with a wide variety of supplemental support devices. Photographic tripods and support arms will find special utility when combined with my support attachment device.

The novel inclusion of passive binding and clenching means afforded by first rope clenching cleat 22 and second rope clenching cleat 24 or integral rope clenching cleat 78 provides benefits beyond current support attachment art. A user of conventional support attachment devices will be called on to use straps and clamps or the like.

Such conventional binding means are of pre-determined length and in the field the user will be limited to the length afforded by the strap or clamp on hand. Instead, by using the present support attachment device, common rope in various lengths may be carried and used individually or joined together to accommodate support objects of varying size.

The user of conventional devices will have to manually attach, and subsequently manually tighten whatever binding means is used. This two step process is frequently cumbersome and time consuming. Additionally, release and removal of such conventional binding means again requires the user to deal with buckles or clamps and the like. Instead, a user of my device will be able to simply lift attaching rope 42 from rope receiving channel 44 and the binding means (attaching rope 42) is instantly and quietly released.

Attachment of support devices to support objects necessarily requires that the binding means used be very tightly secured to prevent movement, sagging, twisting and the like. A user of binding means as provided herein will be able to pull attaching rope 42 as tightly as needed and simply lay attaching rope 42 within rope receiving channel 44 and the device is instantly and securely bound to a support object.

Because of inherent versatility, the invention is best described in operation in some of its various embodiments.

As seen in FIG. 4, placement of the support device as interposed between attachment leg 38 and supplemental support 40 and encircled by attaching rope 42, conventional tripod 36 is positioned in convenient proximity to a user. Here a user may employ a short, lightweight tripod to support devices at convenient heights and positions. Such unique capability now enables a user to carry only a smaller, lighter weight support apparatus, such as conventional tripod 36 and still derive the positional benefit of larger, heavier supports.

Because of the need to simplify the securement of the combined apparatus to supplemental support 40 the user need only tightly encircle the combined apparatus with attaching rope 42 which is instantly held secure by placement in rope clenching cleats 22 or 24 or 48. By enabling the use of common rope, the user is afforded the flexibility of unlimited length and therefore the ability to mount the combined apparatus on large or small supports of any shape.

The support attachment device may be attached to various tripod designs by means of any known attachment methods such as strapping, rope, clamps grippers or the like. Alternatively, or additionally, the support attachment device may be fixedly or removably attached to various tripod designs by means of clamps, bolts, screws, welds, adhesive or the like. Additionally, a "snap type" receiving means within which a portion of a tripod may forcibly fit may be used. The support attachment device may be incorporated within the design of a support apparatus as well, becoming integral to a support apparatus.

The point of attachment to tripods or other support apparatuses will be dependent upon the particular configuration of the support apparatus design. Any portion of a support apparatus may serve as the attachment point, with certain legs, arms, posts, monorails, or the like usually providing the most versatile attachment points.

FIG. 5 depicts a similar use by combining the support attachment device with arcuate bolt type tripod 50. Such a configuration affords the user with a wide range of adjustment capabilities. Placement of an optical device mounting head on the distal end of tripod leg 60 enables the connection of optical devices and the like. Such optical devices may the be conveniently positioned by adjustment of central rotational point 56. Arcuate type tripods by Benbo and Uni-Loc would find significant new uses by incorporating my support attachment device.

Figures 7, 8:
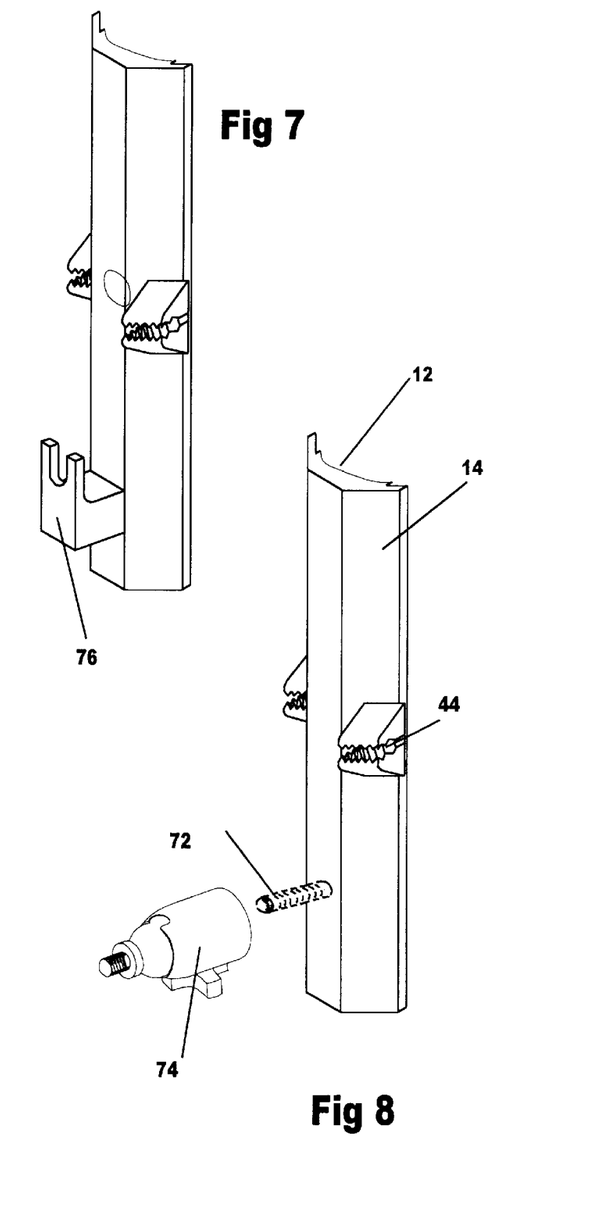
FIG. 7 shows a support attachment device with a support apparatus slotted mounting bracket.
FIG. 8 shows a support attachment device with a support apparatus receiving threaded stud.
Figure 8A:
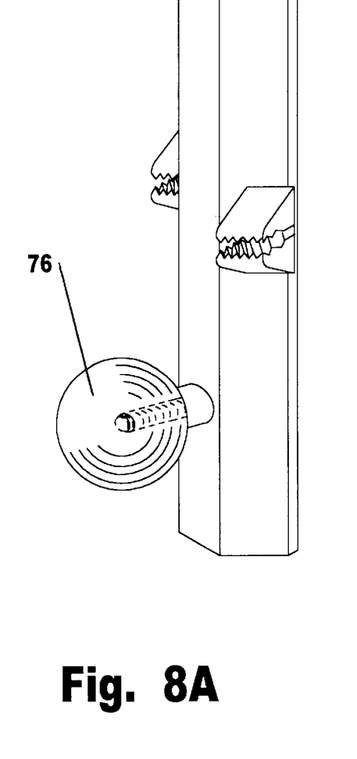
FIG. 8A shows the support attachment of FIG. 8 with a support socket receiving ball.

FIG. 8 show the support attachment device with threaded stud 72. Threaded stud 72 or the like, is suitable for receiving any known type of photo ball-head or other pan-head for the support and manipulation of optical devices, socket balls, or the like. Utilization of such mounting devices affords wide ranging utility. FIG. 8A shows socket receiving ball 76 attached to threaded stud 72. Socket receiving ball 76 may receive any suitable support apparatus that includes socket type attachment means. The resulting ball and socket joint allows for rotational adjustment of the support apparatus. Socket receiving ball 76 may be fixed or removable. Alternatively, the support attachment device may employ a fixed or removable socket as a support apparatus receiving means. (Not Shown). Socket receiving ball 76 is well suited to receive the various components of the ROUND-A-MOUNT support system by National Products Inc.

FIG. 9 shows a support attachment device further including single unit rope clenching cleat 48. Placement of attaching rope 42 within rope receiving channel 44 will clench attaching rope 42 and prevent movement of attaching rope 42 in opposing directions.

OTHER EMBODIMENTS

Swing Arm Bracket—Description

Figure 6:
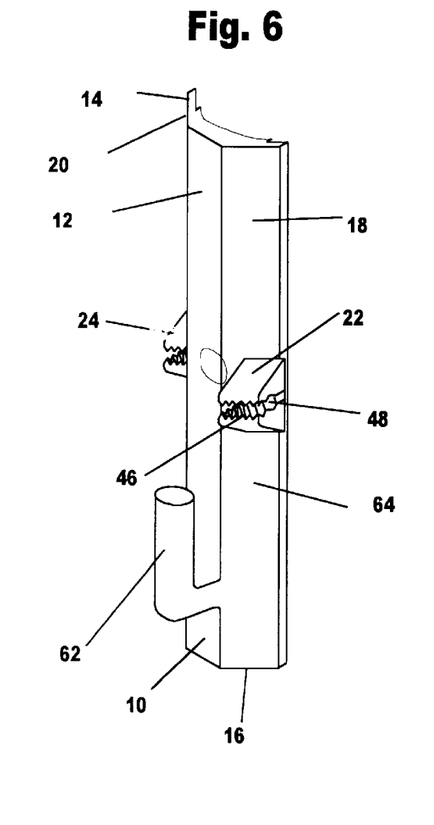
FIG. 6 shows a support attachment device with a support apparatus mounting bracket.

FIG. 6 shows the support attachment device further including a support apparatus mounting bracket 62. Support apparatus mounting bracket 62 is a generally L shaped protuberance rising form the lower portion 64 of support apparatus side 10 of the support attachment device. A variety of support apparatuses may be attached to the support attachment device via support apparatus mounting bracket 62.

Swing Arm Bracket—Operation

FIG. 6 depicts the support attachment device with means for the rotational connection of a swing arm support apparatus. Support apparatus mounting bracket 62 is suitable for connection of a variety of support arms designed for rotation about support apparatus mounting bracket 62. Known support apparatuses such as SAX 10 Side Arm by DAVIS AND SANFORD, a SACA Swing Away Camera Arm by DAVIS AND SANFORD, The BOGEN Magic Arm, the BOGEN Articulated Arm and similar known accessory devices. Additionally, many know clamp type devices may be attached the support apparatus mounting bracket 62. The SLIK Flash Caddy Clamp Head and the like are additional examples.

Slotted Bracket—Description

FIG. 7 shows the support attachment device further including a support apparatus mounting slotted bracket 66. Support apparatus mounting slotted bracket 66 rises from lower portion 64 in the same manner as support apparatus mounting bracket 62. Support apparatus mounting slotted bracket 66 is designed to receive support apparatuses mateably compatible with support apparatus mounting slotted bracket 66 or the like.

Slotted Bracket—Operation

FIG. 7 employs support apparatus mounting slotted bracket 66 which may receive such accessory devices as the BOGEN Maxi-Flex Arm and other support apparatuses with attachment means suitable to be received by support apparatus mounting slotted bracket 66 or the like. Support apparatus mounting slotted bracket 66 is also suitable for the attachment of many known clamps of the "C" type as well as tensioned "Jaw" type attachment means such as the BOGEN Adjustable Gaffer Grip. By way of example, review of pages 14 through 17 of the BOGEN Avenger Grip Catalog COD DEO, USA 496, will show many accessory attachment support devices that may be accommodated by my support attachment device. The universal Clamp by UNI-LOC may also be attached as described.

Threaded Stud—Description

FIG. 8 shows the support attachment device including a threaded stud 72. Threaded stud 72 protrudes from first support apparatus face 18 in a manner which enables the connection of a variety of support apparatus adjustable attachment means such as a ball head 74 or a socket receiving ball 76 as seen in FIG. 8A. Alternatively, any such support apparatus adjustable attachment means may be integral to the support attachment device. Such support apparatus adjustable attachment means as an integral socket receiving ball, an integral ball receiving socket, an integral photographic ball head, a traditional photographic pan head and the like may be utilized.

Threaded Stud—Operation

FIG. 8 show the support attachment device with threaded stud 72. Threaded stud 72 or the like, is suitable for receiving any known type of photo ball-head or other pan-head for the support and manipulation of optical devices, socket balls, sockets or the like. Utilization of such mounting devices affords wide ranging utility. FIG. 8A shows socket receiving ball 76 attached to threaded stud 72. Socket receiving ball 76 may receive any suitable support apparatus that includes socket type attachment means. The resulting ball and socket joint allows for rotational adjustment of the support apparatus. Socket receiving ball 76 may be fixed or removable, may be made of a variety of materials such as plastic, rubber, metal or any other suitable substance or compound.

One Piece Rope Cleat—Description

FIG. 9 shows single unit rope clenching cleat 48 Single unit rope clenching cleat 48 has rope gripping ridges 70 as seen in first rope clenching cleat 22 and second rope clenching cleat 24. Such gripping ridges 70 converge toward the centerpoint of single unit rope clenching cleat 48 in opposing angularity. Such opposing angularity enables clenching of rope placed within single unit rope clenching cleat 48 in opposing directions. Single unit rope clenching cleat 48 includes attachment strap 80 which passes through strap slot 82. In this case, attachment strap 80 acts as a supplement or substitute for attaching rope 42.

One Piece Rope Cleat—Operation

FIG. 9 shows a support attachment device further including single unit rope clenching cleat 48. Placement of attaching rope 42 within rope receiving channel 44 will clench attaching rope 42 and prevent movement of attaching rope 42 in opposing directions.

CONCLUSIONS, RAMIFICATIONS, AND SCOPE

Accordingly, it can be seen that I have provided a novel and versatile invention for the portable support of tripods, tripod support accessories, optical devices, and the like. My invention provides convenience and versatility beyond any known support attachment device.

Capable of being compact and lightweight, my invention meets the needs of those users of objects benefiting from convenient, steady support. Trees and limbs, fence posts and railing, tables, utility poles and the like, at any angle, large or small in size, will serve as supplemental support objects. Serious limitations found in conventional support tools are overcome by my invention. Utilizing readily available rope will put the user in charge instead of the tool. Tightly securable with no knots to tie, means fast and easy attachment to supplemental support objects.

Means for attachment of any known tripod and optical device support accessory further enhances the unique utility of the support attachment device.

Although the description above contains many specificity's, these should not be construed as limiting the scope of the invention but as merely providing illustrations of some of the presently preferred embodiments of this invention. Various other embodiments and ramifications are possible within it's scope. Other embodiments of the support attachment device will be apparent to those skilled in the art. Some users may be benefited by shortening, lengthening, widening or otherwise adjusting the over-all shape and size of the support attachment device. Further, resilient materials or coatings such as plastic, foam, rubber or the like may be used to further facilitate attachment to support objects most often encountered by a particular user.

Further, the features seen in embodiments shown in FIGS. 6, 7, 8, 8A, and 9, among other obvious alternative embodiments, may be used in any desired combination or configuration. My support attachment device may include one or any combination of support apparatus mounting bracket 62, support apparatus mounting slotted bracket 66, threaded stud 72, socket receiving ball 76, as well as any other accessory attachment means. Accessory attachment means may receive known and future tripod support accessories, thereby enabling the attachment of such tripod support accessories to supplemental support objects. An assembly of my support attachment device and an attached support apparatus attached to a supplemental support object will enhance the utility of the support apparatus.

One should note that my invention and its various ramifications is intended to provide versatile support heretofore unavailable. It will be clear to one skilled in the art that a wide variety of materials can be used for construction and a wide variety of combinations, configurations, and simplified assemblies can be accomplished within the scope and spirit of the present invention. Parts may be combined, or consolidated, resized and or reshaped for cosmetic appearance. The invention may be made in a wide range of sizes to accommodate a variety of supported objects.

Various other embodiments and ramifications are possible within the scope of the invention. For example, the support adapter device may utilize general shapes such as, but not limited to, spherical, circular, box-like, or the like. Multiple grooves, edges or notches on the support side to increase gripping capability may be used. Rope gripping clamps replaced or supplemented with any of a wide variety of conventional binding and clamping means. Inclusion of a "snap type" receiving groove to receive tripod legs or other portions of a supported object or parts in addition to or in replacement of straps, clamps or the like. Additionally, such well known assembly parts as common nuts and bolts and screws may not be specifically referenced but will clearly be integral to my invention as seen by anyone skilled in the art.

Thus the scope of the invention should be determined by the appended claims and their legal equivalents, rather than by the examples given.

What is claimed is:

1. A support attachment device to aid in attachment of a support apparatus to a supplemental support object, comprising;

an elongated structure having a first side and a second side;

said first side comprises a first concave surface adapted to fixedly or removably receive a supportable object of elongated shape;

said second side comprises a second concave surface, said second concave surface adapted to fixedly or removably receive a supplemental support object;

a flexible binding means for securing said support attachment device and said support apparatus to the support object, and;

self activating clenching means receiving and securing said flexible binding means.

2. The support attachment device of claim 1, further comprising an additional support apparatus receiving means.

3. The support attachment device of claim 2, wherein such additional support apparatus receiving means is an L shaped bracket.

4. The support attachment device of claim 2, wherein such additional support attachment means is a threaded stud.

5. The support attachment device of claim 2, wherein such additional support attachment means is a socket receiving ball.

6. The support attachment device of claim 2, wherein such additional support attachment means is a ball receiving socket.

* * * * *